(12) United States Patent
Hussey et al.

(10) Patent No.: US 12,472,561 B2
(45) Date of Patent: Nov. 18, 2025

(54) ADDITIVE MANUFACTURING USING POWDER BED FUSION

(71) Applicant: WAYLAND ADDITIVE LIMITED, Huddersfield (GB)

(72) Inventors: Martyn Hussey, Manchester (GB); Matthew Harvey, Stockport (GB); Ian Laidler, Huddersfield (GB); Jakob Van Den Berg, Manchester (GB); William Richardson, Stainland (GB)

(73) Assignee: WAYLAND ADDITIVE LIMITED, Huddersfield (GB)

( * ) Notice: Subject to any disclaimer, the term of this patent is extended or adjusted under 35 U.S.C. 154(b) by 0 days.

(21) Appl. No.: 18/269,227

(22) PCT Filed: Dec. 17, 2021

(86) PCT No.: PCT/GB2021/053352
§ 371 (c)(1),
(2) Date: Jun. 22, 2023

(87) PCT Pub. No.: WO2022/136843
PCT Pub. Date: Jun. 30, 2022

(65) Prior Publication Data
US 2024/0058869 A1    Feb. 22, 2024

(30) Foreign Application Priority Data

Dec. 22, 2020    (GB) ...................................... 2020407

(51) Int. Cl.
*B29C 67/00*    (2017.01)
*B22F 10/28*    (2021.01)
(Continued)

(52) U.S. Cl.
CPC .............. *B22F 12/41* (2021.01); *B22F 10/28* (2021.01); *B22F 10/36* (2021.01); *B22F 12/45* (2021.01);
(Continued)

(58) Field of Classification Search
CPC .......... B22F 10/28; B22F 10/36; B22F 12/41; B22F 12/45; B22F 12/49; B22F 12/90;
(Continued)

(56) References Cited

U.S. PATENT DOCUMENTS 6,259,210 B1 *  7/2001  Wells ................... H01J 27/022
                                                    315/111.41
6,566,663 B1 *  5/2003  Kamijo ................ H01J 37/141
                                                    250/492.2
(Continued)

FOREIGN PATENT DOCUMENTS

CN    104272425 A    1/2015
CN    110301027 A    10/2019
(Continued)

*Primary Examiner* — Ryan M Ochylski
(74) *Attorney, Agent, or Firm* — Perry + Currier

(57) ABSTRACT

A powder bed fusion apparatus arranged to irradiate a powder bed using a charged particle beam is provided, the apparatus comprising a neutralising particle source operable to provide neutralising particles of an opposite charge to the charged particle beam, and a neutralising particle focusing system arranged to weakly focus a beam of the neutralising particles from the neutralising particle source on to the powder bed in the vicinity of the irradiation position of the charged particle beam on the powder, such that the neutralising particles neutralise charging of the powder bed by the charged particle beam. A method of additive manufacture using a powder bed fusion apparatus is also provided, wherein a part is formed as a series of layers, each layer being formed by scanning the charged particle beam over a (Continued)

layer of the powder bed to melt the powder according to a predetermined pattern.

19 Claims, 5 Drawing Sheets

(51) Int. Cl.
    *B22F 10/36*      (2021.01)
    *B22F 12/41*      (2021.01)
    *B22F 12/45*      (2021.01)
    *B22F 12/49*      (2021.01)
    *B22F 12/90*      (2021.01)
    *B33Y 10/00*      (2015.01)
    *B33Y 30/00*      (2015.01)

(52) U.S. Cl.
    CPC .............. *B22F 12/49* (2021.01); *B22F 12/90* (2021.01); *B33Y 10/00* (2014.12); *B22F 2202/13* (2013.01); *B22F 2998/10* (2013.01); *B33Y 30/00* (2014.12)

(58) Field of Classification Search
    CPC ..... B22F 2202/13; B33Y 10/00; B33Y 30/00; B33Y 50/00; B33Y 50/02
    See application file for complete search history.

(56) References Cited

U.S. PATENT DOCUMENTS

| | | |
|---|---|---|
| 2004/0051465 A1 | 3/2004 | Li et al. |
| 2004/0257155 A1* | 12/2004 | McEwen .............. H03K 17/785 330/59 |
| 2015/0306699 A1 | 10/2015 | Honda |
| 2017/0266728 A1 | 9/2017 | Johnson et al. |
| 2018/0269024 A1 | 9/2018 | Nguyen et al. |
| 2018/0311758 A1* | 11/2018 | El Naga ............. B23K 15/0086 |
| 2019/0362936 A1* | 11/2019 | Van Den Berg ........ B22F 10/31 |
| 2021/0260822 A1* | 8/2021 | Elton .................... B29C 64/153 |

FOREIGN PATENT DOCUMENTS

| | | | | |
|---|---|---|---|---|
| CN | 111957959 A | * | 11/2020 | |
| KR | 20100020942 A | * | 2/2010 | |
| WO | WO-2017202726 A1 | * | 11/2017 | .............. B22F 10/20 |
| WO | WO-2018132854 A1 | | 7/2018 | |
| WO | WO-2019136523 A1 | * | 7/2019 | ........... B29C 64/286 |
| WO | WO-2019185642 A1 | * | 10/2019 | .............. B22F 10/20 |
| WO | WO-2019193299 A1 | | 10/2019 | |

* cited by examiner

ADDITIVE MANUFACTURING USING POWDER BED FUSION

FIELD OF INVENTION

The present invention relates to use of a powder bed fusion apparatus in additive manufacturing, and particularly, but not exclusively, to charge control when irradiating metal powders during electron beam additive layer manufacture.

TECHNICAL BACKGROUND

One of the most prominent technologies employed for additive manufacturing is powder bed fusion, in which a thin layer of powder—typically metal or plastic—is selectively melted by an energy source such as a laser or electron beam. The melted area of the powder layer forms a cross-sectional part of an article to be built. After the layer has been selectively melted, a new layer of powder is deposited and then also selectively melted so that a complete article is constructed layer-by-layer.

The metal powder is typically a metallic alloy which suffers from a disadvantage in that it tends to oxidise and become insulating or semi-insulating. When in this insulating or semi-insulating state, irradiation with a charged particle beam in a powder bed fusion process, such as a high-energy electron beam, causes the metal powder particles themselves to become charged and to retain that charge or a fraction thereof. As the charge accumulation increases, the metal powder particles experience an increasing Coulombic repulsion, which may result in the metal powder overcoming gravitational and frictional forces acting on the lower powder layer or melted material. The charged powder layer may then become mobile and may even be expelled from the powder bed, destroying the layer-wise additive process instantly and potentially damaging the apparatus. For example, powder may contaminate, and fuse to, components of the apparatus. High voltage electrical arcs may also be formed, and the mobile powder may scatter the electron beam.

SUMMARY OF INVENTION

According to an aspect of the present invention, there is provided a method of additive manufacture using a powder bed fusion apparatus, the method comprising forming a part as a series of layers, each layer formed by the steps of: (a) irradiating a powder bed with first charged particles to form a region of first charged particles on and in proximity to the powder bed; (b) after the region of first charged particles is formed, irradiating the powder bed using a beam of second charged particles of an opposite charge to the first charged particles, the method comprising scanning the beam of second charged particles over the powder bed to melt the powder according to a predetermined pattern; and (c) deactivating the beam of second charged particles and forming a new layer of powder of the powder bed; wherein the first charged particles mitigate charging of the powder bed by the beam of second charged particles.

The method may further comprise controlling the kinetic energy and current of the first charged particles such that an equilibrium potential below the threshold required to induce powder motion is maintained on the powder bed due to the interaction of the first charged particles and the beam of second charged particles as the beam of second particles is scanned over the powder bed.

The method may further comprise weakly focusing the first charged particles on to the powder bed in the vicinity of an irradiation position of the beam of second charged particles, such that the first charged particles mitigate charging of the powder bed by the beam of second charged particles.

According to another aspect of the present invention, there is provided a powder bed fusion apparatus for use in additive manufacturing, the apparatus comprising: a first source of first charged particles operable to provide first charged particles; a second source of second charged particles operable to provide a beam of second charged particles of an opposite charge to the first charged particles; a powder bed for receiving the first charged particles and the beam of second charged particles; and a controller configured to control operation of the first source and the second source to form a part as a series of layers, each layer formed by the steps of: (a) irradiating the powder bed with the first charged particles to form a region of first charged particles on and in proximity to the powder bed; (b) after the region of first charged particles is formed, irradiating the powder bed using the beam of second charged particles of an opposite charge to the first charged particles, wherein the beam of second charged particles is scanned over the powder bed to melt the powder according to a predetermined pattern; and (c) deactivating the beam of second charged particles and forming a new layer of powder of the powder bed; wherein the first charged particles mitigate charging the powder bed by the beam of second charged particles.

The beam of second charged particles may be a negatively charged electron beam, wherein the first charged particles are positively charged ions.

The first source of first charged particles may be an ion source configured to generate positive ions of a noble gas.

The powder bed fusion apparatus may comprise a plasma source as the first source of first charged particles to generate the positive ions.

The plasma source may be a thermionic emission plasma flood source, a radio frequency plasma source, a hollow cathode plasma source or a duoplasmatron.

The plasma source may be a hollow cathode plasma source or a duoplasmatron, and the apparatus may further comprise a neutralising particle focusing system arranged to weakly focus a beam of the first charged particles on to the powder bed in the vicinity of an irradiation position of the beam of second charged particles on the powder, such that the first charged particles mitigate charging of the powder bed by the beam of second charged particles.

The powder bed fusion apparatus may further comprise a negative extractor electrode or a grid extractor positioned at an output of the plasma source to extract positively charged ions from the plasma to form the beam of first charged particles, wherein the current of the beam of first charged particles is unaffected by a bias potential applied to the plasma source.

The neutralising particle focusing system may comprise a series of electrostatic cylindrical or aperture lens elements aligned along the beam of the first charged particles between the plasma source and the powder bed, and spaced apart so as to support an electric field therebetween, in which each lens element is referenced to a different respective electric potential.

An electrostatic lens element nearest the powder bed may be configured to be at substantially ground potential such that the energy of the first charged particles is substantially defined by the bias potential applied to the plasma source.

The neutralising particle focusing system may comprise a series of electromagnetic lens elements aligned along the beam of the first charged particles between the plasma source and the powder bed, in which each lens element conducts a different respective electric current.

The powder bed fusion apparatus may further comprise one or more ferrites surrounding one or more of the electromagnetic lens elements, such that there is substantially no magnetic field emanating outside of the neutralising particle focusing system.

The powder bed fusion apparatus may further comprise a scanning system arranged to control the beam of first charged particles such that the beam of first charged particles may be scanned over the powder bed in pseudo-synchronisation with the beam of second charged particles, wherein the scanning system may comprise electrostatic or electromagnetic deflectors.

The powder bed fusion may further comprise a wire mesh configured to be at ground potential and positioned at the output of the electrostatic lens element nearest the powder bed, such that there is substantially no electric field penetration from the neutralising particle focusing system or electrostatic deflectors onto the powder bed.

The focusing system may employ a bend, such that there is no direct line of sight between the plasma source and the powder bed through the focusing system.

The powder bed fusion apparatus may further comprise heat shields positioned around the powder bed, wherein the heat shields may be configured to be at ground potential such that there is substantially no electric field between the heat shields and a portion of the focusing system nearest the powder bed.

The powder bed fusion apparatus may further comprise a snubber circuit configured for use in series with a bias potential applied to the neutralising particle source.

The first source of first charged particles may be contained in an auxiliary chamber coupled to a main build chamber of the powder bed fusion apparatus.

Based on the above, embodiments of the present invention provide a method and apparatus for additive manufacture in which effective mitigation of excess charge build-up on the powder bed, caused by the beam used to melt the powder, is enabled.

During the build process, particles of an opposite charge to the particles used to irradiate the powder bed during additive manufacture act to neutralise the charge on metal particles on the powder bed due to irradiation with the charged particle beam used for melting. Mitigation of charging of the powder bed is thus achieved. The instances of charge-induced movement of the metal powder particles can therefore be substantially reduced, or even eliminated, avoiding associated adverse effects.

Techniques disclosed in this application enable optimisation of this mechanism via a 'priming' process which controls the availability of first charged particles for charge mitigation.

In the priming stage, the powder bed is irradiated with first charged particles of an opposite charge to second charged particles used to irradiate the powder bed during additive manufacture. When the build process starts, mitigation of charge build-up on the powder bed occurs in a self-regulating manner. Since first charged particles are available in the vicinity of the powder bed prior to the irradiation of the powder bed by the beam of second charged particles, neutralisation of powder particle charge can occur as soon as the beam of second charged particles is activated, and in a manner which mitigates build-ending excess charge build-up on the powder bed, that would otherwise be caused by the beam of second charged particles. The inclusion of the priming stage prior to forming each layer using the beam of second charged particles ensures that the resulting charge on the powder bed is below a threshold required to induce powder mobility, avoiding exacerbation of adverse effects described above.

Techniques disclosed in this application also utilise a neutralising particle focusing system, which is arranged to provide a focused beam of neutralising first charged particles which can be scanned over a powder bed. This approach enables an efficient operation of a neutralising particle source, which may also lead to extension of the lifetime of the source of neutralising first charge particles, as well as enabling a uniform distribution of neutralising particles over the build area.

BRIEF DESCRIPTION OF DRAWINGS

Embodiments of the present invention will be described by way of example only, with reference to the accompanying drawings, in which.

It will be appreciated that for convenience of explanation, some elements of the drawings are not shown to scale.

DETAILED DESCRIPTION

Figure 1:
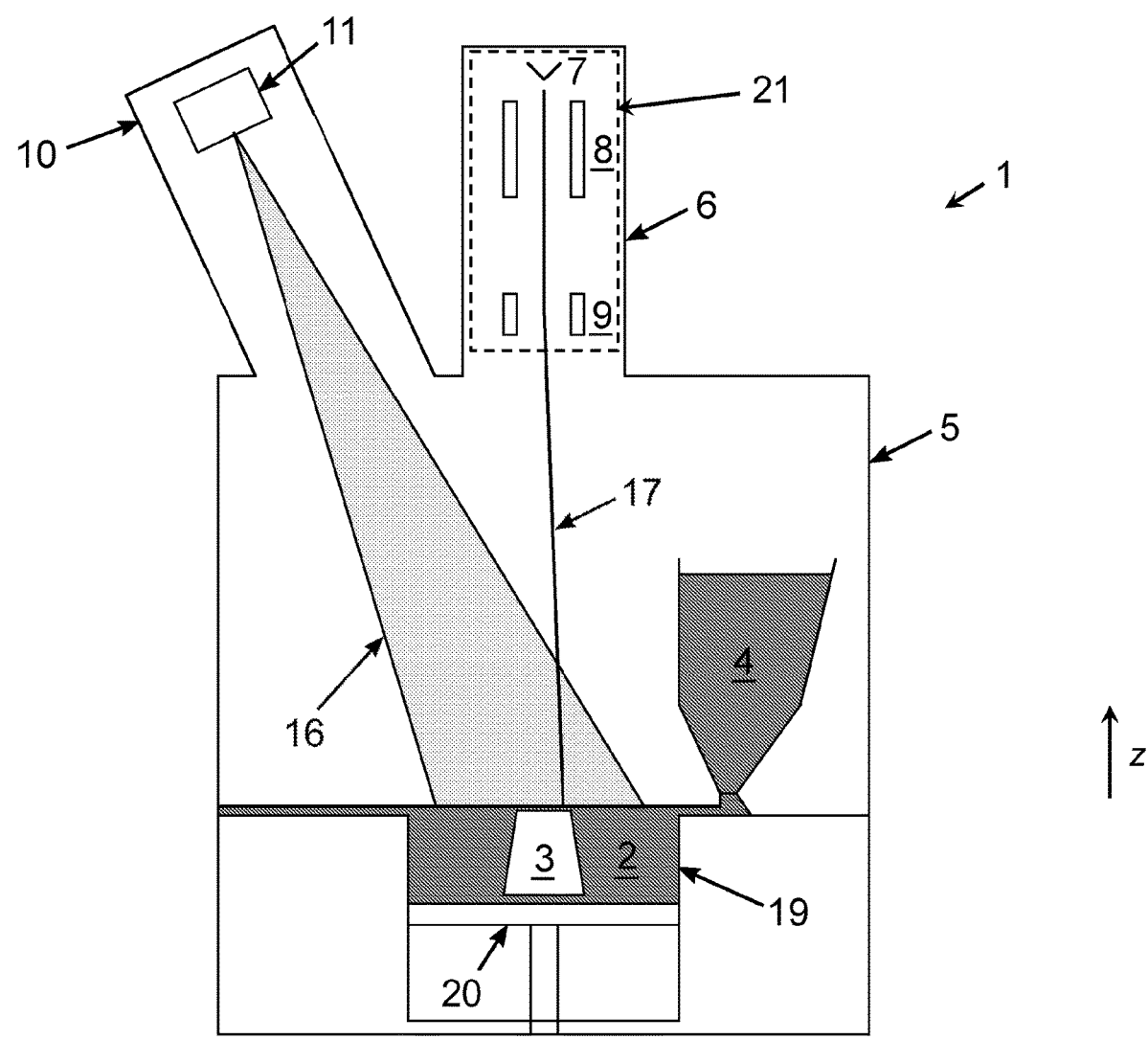
FIG. 1 shows an additive layer manufacture apparatus according to embodiments of the present invention.

FIG. 1 shows a powder bed fusion apparatus 1 according to embodiments of the present invention. The apparatus 1 shown in FIG. 1 is configured for additive manufacture using an electron beam 17 to melt metal powder to form a part 3 layer-by-layer.

The powder bed fusion apparatus 1 comprises an electron-optical assembly 21 to form, condition and steer an electron beam 17. The electron-optical assembly 21 comprises an electron source 7 arranged to emit electrons. The electron-optical assembly 21 further comprises an electron extraction and focusing element 8 for forming an electron beam 17 focused at the powder bed from the emitted electrons, which travels along what is shown in FIG. 1 as the z-axis of the apparatus 1. The electron-optical assembly 21 further comprises an electron deflection system 9 for scanning the electron beam 17 over a bed 2 of metal powder, to melt powder into a desired additive manufactured part 3. The electron deflection system 9 comprises electromagnetic deflectors arranged around the electron beam 17.

Operation of the electron optical assembly 21 is controlled via signals derived from a build controller (not shown), such as one or more suitably programmed computers or processors, in accordance with a scan file for the desired part 3, as is known in the art.

The apparatus 1 further comprises at least one hopper 4 operable to dispense powder via a dispensing mechanism (not shown) and a stage 20 to support a build tank 19 positioned to receive the dispensed powder in a volume defining the powder bed 2. The stage 20 is movable in the z-direction via a piston, and the hopper 4 and piston are controlled in conjunction with signals derived from the build controller (not shown).

The apparatus 1 further comprises an ion source 11 for generating and emitting ions to be used in a charge mitigation mechanism used in an additive manufacturing method according to embodiments of the present invention, to be described in more detail below.

In the configuration shown in FIG. 1, the ion source 11 is a plasma source. The direction of travel of the ion flux 16 emanating from the plasma source 11 forms an angle relative to direction of travel of the electron beam 17. In the embodiment shown in FIG. 1, the electron beam 17 is parallel to the z-axis and the direction of ion flux 16 is angled thereto, but in alternative embodiments, the direction of ion flux 16 could be aligned with the z-axis, and the electron beam 17 angled thereto. Operation of the plasma source 11 is controlled via signals derived from the build controller (not shown).

Additive manufacture is performed under vacuum conditions in embodiments of the present invention. Hence the apparatus 1 further comprises a build vacuum chamber 5 through which the focused electron beam 17 and ion flux 16 pass before being incident on the powder bed 2. Coupled to the build vacuum chamber 5 is a first auxiliary vacuum chamber 6 containing the electron-optical assembly 21, and a second auxiliary vacuum chamber 10 containing the plasma source 11. Vacuum conditions are maintained, as known in the art in powder fusion systems, with vacuum pressures of the order of $1 \times 10^{-3}$ mbar to $1 \times 10^{-7}$ mbar.

The hopper 4 dispenses powder so as to deposit a measured quantity of the powder on the powder bed 2 surface. A mechanism such as a scraper or blade (not shown) is used to disperse the powder evenly over the moveable stage 20. The electron-optical assembly 21 forms and steers the electron beam 17 such that the electron beam 17 is scanned over the powder bed 2 to heat and melt the powder and form a solid layer of a part 3. After each layer of the part 3 has been formed, the stage 20 is lowered in the z-direction to accommodate the increasing height of the part 3 and to allow the next layer to be spread.

Charge Mitigation

As noted above, the interaction of the negatively charged electron beam 17 with the powder particles can cause the unmelted powder particles to become negatively charged, due to the insulating or semi-insulating oxide layer on the metal powder particles.

In the absence of the charge mitigation methods used in embodiments of the present invention, this can lead to the accumulation of negative charge on the powder which can adversely affect the build process, including build-ending events as described above, in which powder particles are displaced from the powder bed 2 due to the Coulombic repulsive force imparted by other charged particles of the same charge polarity in the powder bed 2, and travel throughout the build chamber 5.

In a "priming" stage prior to activation of the electron beam 17 at the start of a build process, the powder bed 2 is irradiated with ions from the plasma source 11 such that the powder bed becomes charged to a positive potential. For a static state powder bed 2 (i.e. an area of powder with no electron beam incident upon it) an ion flux 16 incident on the powder will continue to deposit charge on the powder until the induced potential (in V) on the powder bed 2 equals the magnitude of the kinetic energy of the ions (in eV). At this point the electrical potential of the charged powder bed 2 is sufficient to form a barrier to further incoming ions, which do not have the kinetic energy necessary to overcome the potential barrier to reach the powder bed 2. The potential barrier decreases the kinetic energy of further incoming positive ions until they have near zero kinetic energy by the time they reach the charged powder bed 2, and form a "cloud" of free positive ions above the charged powder bed 2. These free positive ions with near zero kinetic energy are available to mitigate excessive accumulation of negative charge during the build process.

The priming stage is configured such that powder bed 2 is not charged to the extent that motion of the powder is induced. This is achieved by suitable limitation of the energy of the first charged particle beam.

After the priming stage, the electron beam 17 is activated and directed to the powder bed 2. The electron source cathode is held at a high voltage such as approximately −60 to −80 kV, with respect to the electron source anode which is referenced to ground, to accelerate the electrons in the electron beam 17 away from the electron source 7 and towards the powder bed 2. This corresponds to an electron beam energy of approximately 60-80 keV with a pseudo-monochromatic energy characteristic. The plasma source 11 is biased with a lower positive voltage such as +80 to +300 V, for example, +200 V, chosen so as to optimise ion energy to maximise the deposition of positive charge on the powder particles, whilst not initiating charged-induced powder movement that would interfere with the melting process of the powder by the electron beam 17.

The positive charge that accumulated on the powder bed 2 during the static state is removed by a negative charge accumulating on the powder bed 2 due to the electron beam 17. The electron beam 17 is capable of inducing a much larger negative potential than the positive potential induced by the ion flux 16, and thus the irradiated area of the powder bed 2 becomes negatively charged. This negative charge attracts positive ions from the free positive ion cloud above the powder bed 2, in some cases, via the conduit of the electron beam 17 itself, which serves to counteract the negative charge due to the electrons.

An equilibrium potential on the area of powder being melted is then established due to the interaction of the ion flux 16 and electrons from the electron beam 17 as it is scanned over the powder bed 2. The equilibrium potential is below a threshold at which powder mobility would be initiated. As the electron beam 17 and the ion flux 16 continue to be used, the cloud of free ions above the powder bed 2 is continuously replenished. Thus, ions are readily available for charge neutralisation as required (i.e. depending on the amount of negative charge accumulating on the powder bed 2 due to use of a particular material or electron beam scan strategy, for example) throughout the build. In this way, a self-regulating charge mitigation process is enabled.

This process of self-regulation prevents the powder from accumulating too much negative charge, thus avoiding a number of potentially build-ending events caused by excess charge on the powder bed 2, as described above.

Some embodiments of the present invention comprise a user interface connected to the build controller to enable a user to tailor charge neutralisation parameters to specific build environments (e.g. materials, feature resolution), so as to influence how many ions are available for charge neutralisation, the timescale for the charge neutralisation process, and the maximum number of ions that can be deposited on the powder bed 2. Electron beam parameters used during a build (e.g. electron beam current, spot size, scan speed, scan path and hatch geometry) all determine how much negative charge is deposited on a given area of the powder bed 2 during a given time. Therefore, the charge neutralisation process is highly dependent on the exact build parameters used.

The build parameters may vary significantly from layer to layer, and so in some embodiments, it is possible to adjust the charge neutralisation parameters between layers in accordance with this variation.

In the embodiments illustrated in FIG. 1, a plasma source 11 is shown, which is embodied as plasma flood source. The plasma source 11 produces low-energy positive ions from application of an atomic ionisation process to a gas, such as one of the noble gases, for example argon, helium or xenon, chosen so as not to cause interstitial contamination of the metal lattice of the resulting metal part 3 formed at the build surface. Use of helium, which has the lowest mass and highest mobility of the noble gases, may aid the efficiency of the neutralisation process. The atomic ionisation process may be based on thermionic emission from a current-carrying tungsten filament to ionise the gas in a discharge chamber held at a positive bias potential with respect to ground. A plasma generated in this manner is caused to exit the discharge chamber via an aperture in the plasma source 11.

As illustrated in FIG. 1, the plasma flood source 11 is such that it is contained in a separate vacuum chamber 10 attached to the build vacuum chamber 5.

Cascade Ionisation and Suppression

It may also be necessary to mitigate effects, on the build process, of the occurrence of electron impact ionisation of particles present in the build area.

During the build process, electrons from the incident electron beam 17 may be elastically backscattered from the surface of the powder bed 2. The electrons from the incident electron beam 17 may also generate secondary electrons by ionising material at the build surface, and these secondary electrons may be ejected from the surface of the powder bed 2. The backscattered electrons and the secondary electrons can both cause further ionisation of ions and atoms present in the build area (atoms and/or ions emanating from the plasma flood source 11, or atoms having evaporated from the melt pool 18), producing further electrons which can in turn cause yet further ionisation events. Such a sequence of ionisation events is referred to herein as cascade ionisation.

An electric field is present near the build surface due to the proximity of the positively-biased discharge chamber of the plasma flood source 11 and the powder bed 2, and due to the positively charged ion flux 16 surrounding the negatively charged conduit of the electron beam 17. This combined electric field is of a magnitude sufficient to impart additional energy to the secondary electrons in the build area, leading to increased electron-atom interactions and thus playing a significant role in the occurrence of cascade ionisation.

As a result of the processes described above, large electron and ion currents are generated within the build volume. The large electron currents generated in the build area may interfere with the operation of the plasma flood source 11 and the power supplies attached to the plasma flood source 11. If interference with the operation of the plasma flood source causes a change to the electric field generated by the ion flux 16 surrounding the electron beam 17, due to a change in the ion current density around the electron beam 17 and/or the melt pool 18, this can result in the position of the electron beam shifting.

The field effects described above have the potential to cause numerous issues relating to the porosity, surface finish and geometrical accuracy of additive manufactured components. The charge mitigation method and apparatus described below provide a solution to such problems.

In the embodiments described above, the substantial removal of charge-induced effects associated with charged powder particles leaving the powder bed 2 is achieved by introducing a priming stage into the build process. In cases where mitigation of the effects of cascade ionisation is required, a snubber circuit may be arranged in series with the bias potential applied to the plasma flood source 11. The snubber circuit enables regulation of the bias potential in the event that cascade ionisation occurs at the powder bed 2.

As described above, the plasma flood source 11 is biased with a positive voltage. In some embodiments, the plasma source bias power supply unit (PSU) sets the voltage of the exterior of the plasma flood source 11 at approximately +80 to +300 V. During normal operation, this bias voltage acts to extract electrons from the plasma generated by the plasma flood source 11, resulting in a dominant ion flux 16 leaving the plasma flood source 11 and being incident on the powder bed 2.

When cascade ionisation occurs at the powder bed 2, however, the large electron currents generated impact the exterior surface of the plasma flood source 11 and travel to ground via the PSU. This exceeds the maximum current of the PSU (typically ~2.5 A) and causes the PSU to reduce its set voltage via self-regulation, and consequently, the bias potential of the plasma flood source 11. The reduction in voltage has the effect of reducing the electric field at the melt pool 18. This is due to fewer electrons being extracted from the plasma, leading to a reduced overall ion current exiting the plasma flood source 11; thus, the magnitude of the interaction between the electron beam 17 and the ion flux 16 is reduced, thereby reducing the electric field. The reduction in voltage on the exterior of the plasma flood source 11 may also be a contributing factor.

The reduction in electric field suppresses the cascade ionisation processes in the build area, which reduces the electron current incident on the exterior surface of the plasma flood source 11 travelling to ground via the PSU. When the electron current passing through the PSU drops below the maximum current of the PSU, the voltage of the PSU recovers to the set level.

Once the voltage of the PSU has recovered, the electric field re-establishes as before (due to the proximity of the plasma flood source 11 to the powder bed 2 and the presence of positive ions in the vicinity of the powder bed 2), and the cascade ionisation process is thus restarted.

In this manner, the process described above repeats itself continually, with the effects of cascade ionisation being repeatedly initiated and supressed. Cascade ionisation therefore introduces instability to the ion current reaching the powder bed 2, leading to inconsistent availability of ions in the vicinity of the melt pool 18 for charge neutralisation. Such instability in the ion current density induced around both melt pool 18 at the powder bed 2, and along the whole length of electron beam, change the physical position of the electron beam 17, compromising the build process.

Figure 2A:
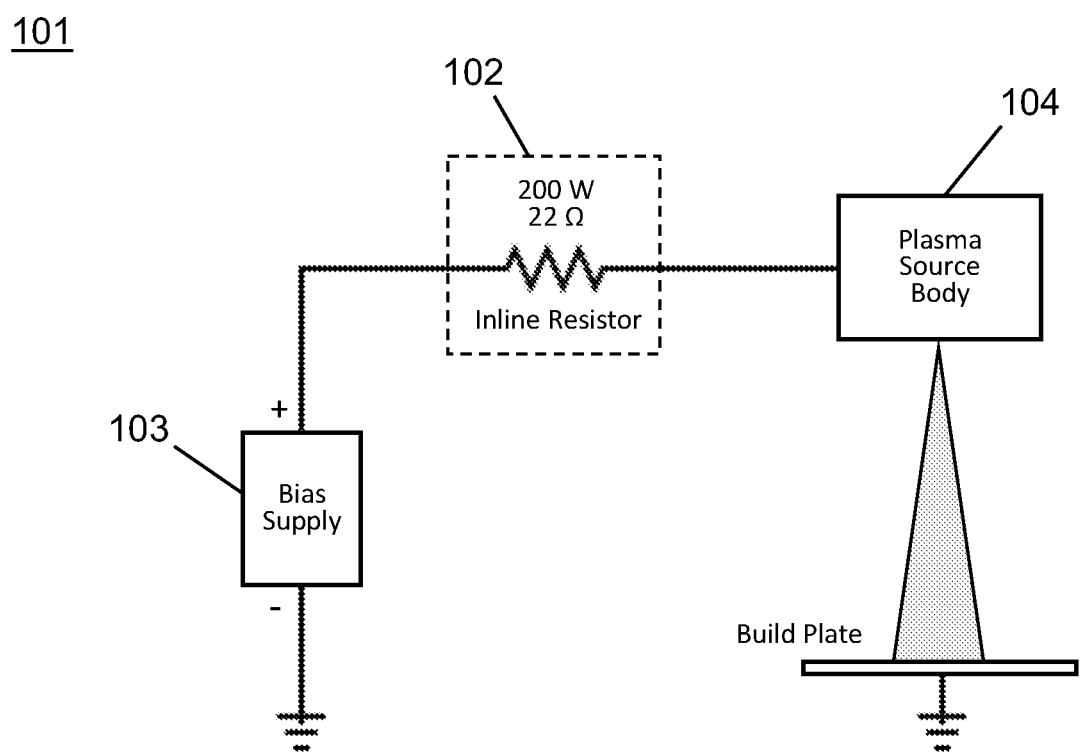
FIG. 2a shows a passive snubber circuit used in an additive layer manufacture apparatus according to embodiments of the present invention.

The primary objective of the snubber circuit is to stabilise the ion current density. In the embodiment shown in FIG. 2a, snubber circuit 101 comprises a high power resistor 102 in series on the PSU positive line between the PSU 103 and the plasma flood source discharge chamber 104. This arrangement is referred to herein as a "passive snubber". For example, the resistor 102 may be a high power (200 W) 22Ω resistor. In other embodiments, the passive snubber 101 may be of capacitive or inductive design.

When cascade ionisation occurs, the large electron current passes to ground via the resistor 102. This induces a voltage drop across the resistor 102, proportional to the product of the current and resistance. This voltage drop reduces the effective bias voltage of the plasma flood source 104 which, as described above, reduces both the electric field due to the plasma flood source 104 and the electric field due to ion-electron interaction. The overall reduction in the electric field suppresses the intensity of the cascade ionisation effects, or may eliminate cascade ionisation effects altogether.

The snubber 101 is able to operate in the manner described above more quickly than the PSU 103 is able to regulate its own supply voltage to compensate for a high current. As such, the snubber 101 is able to assist the self-regulation of the PSU 104, and to cause reduced deflection of the electron beam position, in terms of both frequency of occurrence and magnitude.

Figure 2B:
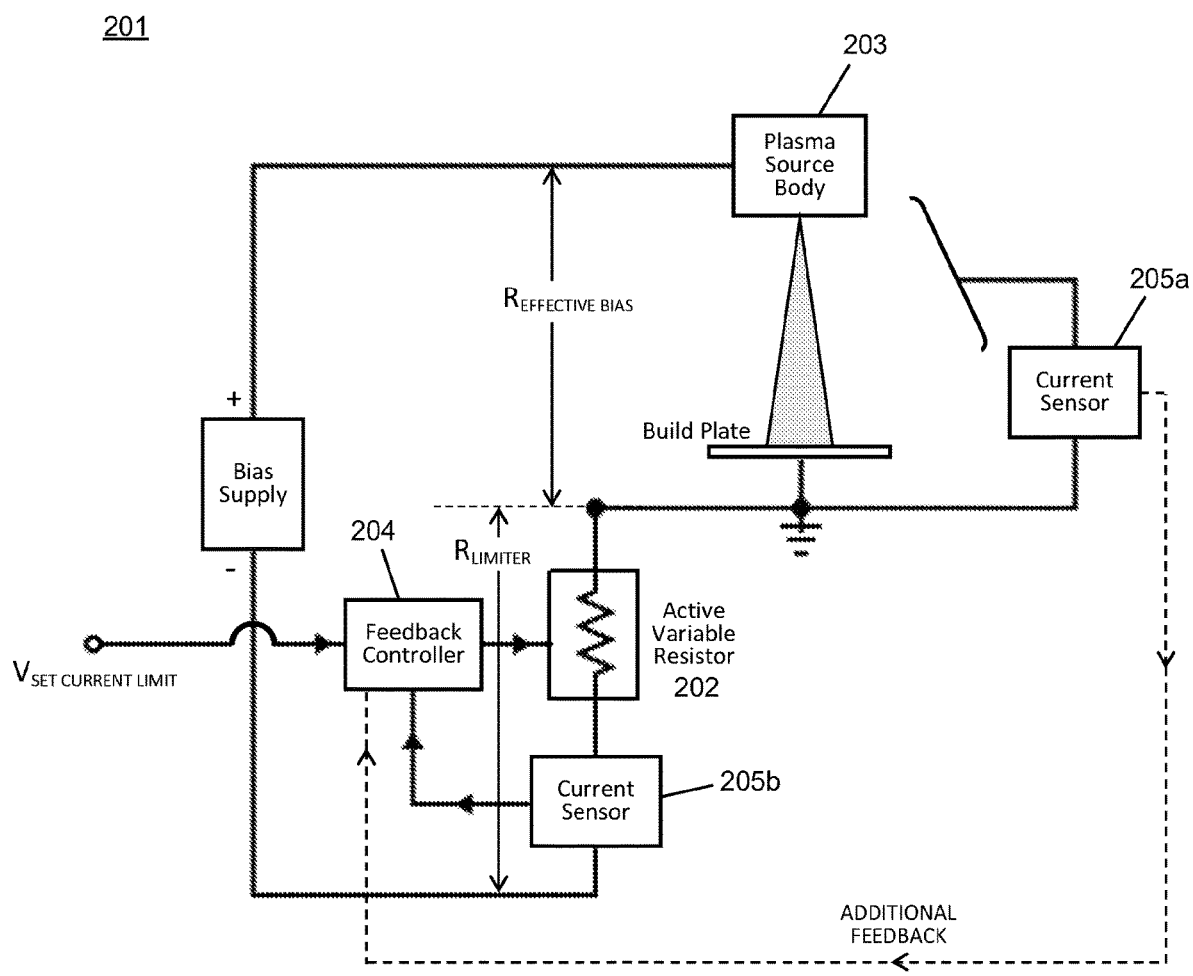
FIG. 2b shows an active snubber circuit used in an additive layer manufacture apparatus according to embodiments of the present invention.

In other embodiments, the snubber circuit utilises an active feedback system to control the ion current density at the powder bed 2. Such an arrangement is referred to herein as an "active snubber". In the embodiment shown in FIG. 2b, the active snubber 201 comprises a variable resistance 202, for example, a MOSFET or a variable resistor, which supports an effective bias voltage to the plasma flood source body 203. A feedback controller 204 actively controls the effective bias voltage based on the bias current measured by one or more current sensors 205a, 205b.

When cascade ionisation occurs and the resulting spike in bias current is detected, the feedback controller 204 adjusts the variable resistance 202 to control the effective bias voltage provided in order to stabilise the bias current. The feedback controller 204 is able to operate to suppress cascade ionisation yet more quickly than the passive snubber, where the required time dynamics justify the provision of the active feedback system.

Focusing Mechanism

As set out above, a number of different charge-induced effects can be substantially removed by priming the powder bed 2 with positive charge ahead of the build to account for negative charge induced by the electron beam 17, and optionally, by employing a snubber to regulate the bias potential of the plasma flood source 11 when cascade ionisation processes occur in the build area.

Such charge neutralisation techniques involve neutralising ions, which are distributed over an area of the powder bed 2 that is significantly larger than the area of the melt pool 18. The intensity of the wide area ion flux 16 incident on the powder bed 2 falls off rapidly with increasing distance from its central axis.

As the required build size increases, it will be appreciated that the required coverage of the ion flux 16 increases, and in the case of use of a plasma flood source 11, such an increase in coverage area introduces non-uniformity in the neutralisation distribution of ions at the powder bed 2. In addition, a larger build area will result in a longer build time, which increases the length of time for which the plasma flood source 11 is to be operated, thereby putting additional hours on its consumable filament.

Embodiments of the present invention aim to provide a solution to these issues by providing a focused beam of ions which can be scanned over a powder bed. This approach relaxes the requirement to flood a build area with neutralising ions and enables more efficient operation of a plasma source.

By focusing ions from the plasma source, it is possible to increase the current density of ions at the melt pool while significantly reducing the total ion output from the plasma source, which prolongs the lifetime of the plasma source, while scanning of a focused ion beam also enabling a uniform distribution of neutralising ions over the build area. For example, if a wide-area flood system employs a current of 1 A, a comparable focused ion column system would employ a current of 10-100 mA.

Figure 3:
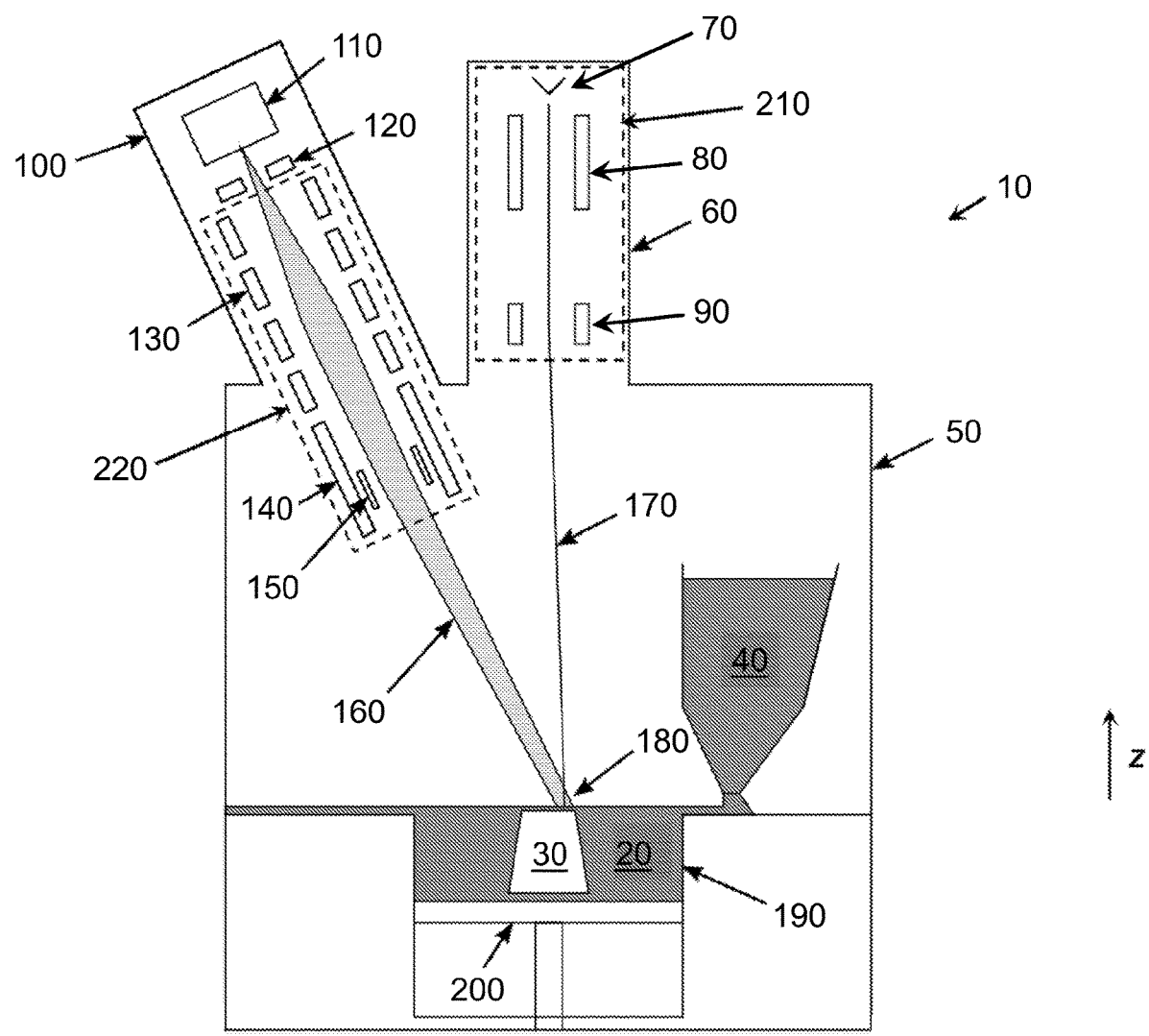
FIG. 3 shows an additive layer manufacture apparatus including a neutralising particle focusing system according to embodiments of the present invention.

In the configuration shown in FIG. 3, the powder bed fusion apparatus 10 further comprises an ion focusing system 220. A point source or near-point source of positive ions is used to provide ions to the focusing system 220. The beam of ions may have broader beam width and/or divergence than the electron beam 170, and the term "beam" is not used herein to require use of any specific beam width. The plasma source 11 may be, for example, a duoplasmatron or hollow cathode plasma source. In the description which follows, embodiments are described in the context of a duoplasmatron 110.

The focusing system 220 is arranged to condition and steer the ion beam 160 produced by the duoplasmatron 110. By focusing the ion beam 160, it can be ensured that the ions are concentrated in a specific region of the powder bed 20. By steering the ion beam 160, it is possible for its position to track the position of the electron beam 170, thus ensuring that the ions are provided only to the region of the powder bed 20 where charge neutralisation is required. This combination achieves a high ion current density at the melt pool 180, and thus allows the absolute ion output from the duoplasmatron 110 to be reduced without compromising the charge neutralisation process. The ability to scan the ion beam 160 over the powder bed 20 further enables uniform charge neutralisation over large build areas.

Referring to FIG. 3, the ion focusing system 220 is shown within a column which is arranged at an angle relative to the direction of travel of the electron beam 170. In the embodiment shown in FIG. 3, the electron beam 170 is parallel to the z-axis and the ion focusing system 220 is angled thereto, but in alternative embodiments, the column could be aligned with the z-axis, and the electron beam 170 angled thereto. The column is also referred to herein as an ion column. In more detail, the ion focusing system 220 comprises a plurality of ion focusing lens elements 130 for forming a weakly focused ion beam 160 from the unfocused ions exiting the duoplasmatron 110, which travels along the longitudinal axis of the ion focusing system 220. Operation of the ion focusing system 220 is controlled via signals derived from the build controller (not shown).

The apparatus 10 further comprises a high-voltage negative extractor element 120 positioned at the output aperture of duoplasmatron 110, to retard electrons and extract ions in the plasma produced by the duoplasmatron 110. The extractor element 120 is referenced to a large negative potential such as −4 to −10 kV, and may be an electrode, grid, or series of grids.

The apparatus 10 is arranged such that the duoplasmatron 110, extractor electrode 120 and ion focusing system 220 are contained in a separate vacuum chamber 100 shaped to match the ion column, attached to the build vacuum chamber 50. The high electric field between the duoplasmatron 110 and the extractor electrode 120 acts as a focusing element, attracting and effectively channelling those positive ions which leave the duoplasmatron 110 towards the input element of the ion focusing system 220. In this manner, only the ion component of the plasma enters the ion focusing system 220 for focusing in the manner described below.

The length of the ion column permits the duoplasmatron 110 to be located further from the powder bed 20, whilst still maintaining an ion current density sufficient to enable effective charge neutralisation through use of the ion focusing system 220. An increased distance between the duoplasmatron 110 and the powder bed 20 reduces incorporation of evaporated tungsten from the thermionic filament in the build material.

As described above, use of the ion focusing system 220 increases the ion current density at the melt pool 180, thus allowing the gas flow rate into the duoplasmatron 110 to be reduced. This in turn reduces the gas pressure at the build surface, minimising the risk of cascade ionisation processes of atoms and ions emanating from the duoplasmatron 110 and thus substantially reducing charge-induced effects which adversely affect the build.

In some embodiments, the ion focusing system 220 employs a bend. This arrangement would further reduce contamination of the build area by the duoplasmatron 110, or contamination of the duoplasmatron 110 by the evaporated metal atoms from the powder bed 20, by eliminating a direct line of sight between the duoplasmatron 110 and the powder bed 20 through the ion focusing system 220.

As previously outlined, the ion focusing system 220 comprises a series of lens elements aligned along the ion beam 160 between the duoplasmatron 110 and the powder bed 20. The series of lens elements comprise ion focusing lens elements 130 to form a weakly focused ion beam 160. The ion beam 160 is weakly focused over a region of 50-60 mm, and is scanned in pseudo-synchronisation with the irradiation position of the electron beam 170, such that an area of powder surrounding the irradiation position of the electron beam 170 accumulates a positive charge before it is irradiated via scanning of the electron beam 170 to its position during the build process.

In some embodiments of the present invention, the ion focusing system 220 comprises a series of electrostatic lens elements aligned along the longitudinal axis of the ion focusing system 220, each biased to a different respective electric potential, and spaced apart longitudinally so as to support an electric field therebetween. The ion focusing system 220 may be composed of a series of multi-element cylinder or aperture lenses. In some embodiments, the lens elements 130 are cylinder lenses of diameter D, separated by a gap G, where the ratio G/D is approximately 0.1. The lens elements may be formed of stainless steel, aluminium or the like. The focal properties of such electrostatic lens systems are a function of the lens voltages, the cylinder or aperture diameters, the gap between the lens elements and the energy of the ions travelling through the lens system.

The configuration of embodiments of the present invention provides a higher ion current density with a focused ion beam and lower ion source current, than if no ion focusing system 220 were present. As described above, this permits the duoplasmatron 110 to be operated using a lower thermionic filament current and with lower gas throughput, as high current densities at the build surface can be maintained using a lower total ion source current. This extends the lifetime of the duoplasmatron no and reduces downtime by extending the time period between user servicing. Thus, the increased build times required for larger builds covering wider areas of the powder bed and comprising more layers can be achieved.

The lens element 140 nearest the powder bed 20 is configured to be substantially at ground potential such that the ion energy is defined by the potential difference between the bias potential applied to the duoplasmatron no and the lens element 140 nearest the powder bed 20, in addition to the starting energy of the emitted positive ions (of the order of 10 eV). Grounding of the final lens element 140 avoids the introduction of an electric field, due to the proximity of an electrode at a potential, to the region of the powder bed 20, while the energy of the ion beam 160 can be readily controlled via the duoplasmatron bias potential. "Substantially" at ground is to be interpreted as including either electrical tolerances or deviation from ground which can be accommodated within a particular build process.

In alternative embodiments, the ion focusing system 220 comprises a series of electromagnetic coil lens elements, each carrying a different respective electric current and spaced apart longitudinally.

The powder bed fusion apparatus 10 further comprises a scanning system, referred to herein as an ion deflection system 150, arranged to control the weakly focused ion beam 160 such that the ion beam 160 can be scanned over the powder bed 20 in pseudo-synchronisation with the focused electron beam 170. The scanning process is controlled in conjunction with instructions provided from the build controller, based on a scan file for the build process. The scan file specifies a numbers of parameters such as beam energy, beam current and beam spot size, as well as a series of beam positions and dwell times defining the path of the beam across the powder bed 20, for each layer of the part 30, as is known in the art.

This pseudo-synchronisation enables the ion beam 160 to fully encompass the region of the irradiation position of the electron beam 170, shown as corresponding to a melt pool 180 in FIG. 3, such that at least some of the positive ions, particularly those closest to the irradiation position of the electron beam 170, are attracted to the negatively charged powder particles where they help counteract some or all of the negative charge. This helps mitigate the adverse effects of the negative charge due to the electron beam 170, as described above, and keeps the powder particles below a potential threshold at which Coulomb interaction would cause them to leave the powder bed 20. Some of the positive ions, which are further from the irradiation position of the electron beam 170, cause an area of the powder bed 20 not yet irradiated by the electron beam 170 to acquire a positive charge, but are not themselves attracted to the negatively charged powder particles as the Coulomb force falls off rapidly with increasing distance according to an inverse square law. The mechanism by which the powder bed 20 not yet irradiated by the electron beam 170 acquires a positive charge is analogous to the priming process described above, and leads to replenishment of the cloud of ions for neutralisation during the build process.

The ion deflection system 150 comprises electrostatic deflectors which are, in some embodiments, a series of plates aligned around the longitudinal axis of the ion column such that the normal to the surface of each plate is perpendicular to the longitudinal axis of the ion column. The plates are paired, with each member of the pair located on opposite sides of the longitudinal axis of the ion column, and each biased with a potential such that an electric field is generated perpendicularly across the direction of the ion beam 160. In some embodiments, the x-y deflection system comprises two pairs of plates with each pair arranged at 90 degrees relative to each other about the longitudinal axis of the ion column.

In some embodiments, the ion deflection system 150 is located in the grounded final lens element 140, such that that the penetration of the deflection transverse electric field from the lens element 140 onto the powder bed 20 is kept to a minimum. Preferred materials for the deflectors are non-magnetic materials such as stainless steel, aluminium or titanium.

The electrostatic deflectors 150 are electronically coupled to the electromagnetic deflectors 90 for the electron beam 170. The coupling is controlled by the build controller in a manner which ensures that the weakly focused ion beam 160 and incident electron beam 170 loosely follow each other when scanned, in a pseudo-synchronous manner. In particular, the pseudo-synchronisation enables the electron beam 170 to move rapidly within the envelope of the ion beam 160. The use of such a combination of electrostatic and electromagnetic deflectors enables the advantages of each, in terms of deflection angle and response rate, to be used optimally. In alternative embodiments, the ion deflection system 150 uses electromagnetic deflectors. The distance between the deflectors and the powder bed 20 is taken into account in the nature of the deflection mechanism used and the deflection angles required. In some embodiments, the distance between the deflectors and the powder bed 20 is in the region of 200-500 mm.

In some embodiments, the apparatus 10 further comprises a wire mesh configured to be substantially at ground potential and positioned at the output of the final electrostatic lens element 140, such that there is substantially no electric field penetration from the electric field generated by the electrostatic deflectors 150 or the ion focusing system 220 into the build area.

In the case that the ion focusing system 220 comprises electromagnetic lenses and/or the ion deflection system 150 comprises electromagnetic deflectors, the powder bed fusion apparatus 10 may further comprise one or more high magnetic-permeability ferrites, such that there is substantially no magnetic field outside the ion focusing system 220 or the ion deflection system 150.

In some embodiments, the apparatus 10 further comprises electrically isolated metallic sheets positioned surrounding the powder bed 20 which act as heat shields, reflecting the infrared radiation from the powder bed 20 away from other components of the apparatus 10 and back to the powder bed 20. In such cases, the heat shields are configured to be substantially at ground potential such that there is substantially no electric field between the heat shields and the lens element 140 nearest the powder bed 20.

In some embodiments, the plasma source is hollow cathode plasma source. Through avoiding a resistively heated thermionic filament, the lifetime of the plasma source is extended significantly to thousands of hours. In addition, a hollow cathode plasma source is advantageous in terms of its ability to emit high ion currents, making more ions available for neutralisation. This enables a higher ion current density at the melt pool 18, and, in some cases, the beam of ions produced by the hollow cathode plasma source may provide sufficient ion current density at the melt pool 18 without use of the ion focusing system 220.

Ion Beam Control

Due to the use of the extractor electrode 120, as described above, the ion current from the plasma is not influenced by the relatively small bias potential used at the duoplasmatron 110, but is instead determined by parameters affecting the rate of generation of positive ions, such as the current through the tungsten filament of the duoplasmatron 110, the gas pressure in the duoplasmatron 110, and the size of the output aperture of the gas discharge chamber.

As a result, the ion energy and the ion current are affected by different parameters, and can be controlled independently of each other. Adjustment of the ion current can be used to control how many ions are available for charge neutralisation, as well as the timescale for the charge neutralisation process. Adjustment of the ion energy can be used to control the maximum number of ions that can be deposited on the powder bed 20.

As outlined previously, the optimum parameters for charge mitigation may take into account the specific electron beam parameters to be used during particular portions of a build, based on the scan strategy to be applied to the electron beam 17. For example, during builds that use high electron beam currents at slow electron beam scan speeds, the electron beam 170 will deposit larger amounts of charge per unit time per unit area on the powder bed 20, thus requiring a greater number of ions for effective charge neutralisation.

In addition, independent variation of ion current and energy is required to fully optimise the charge neutralisation parameters for different materials used in a build and for different electron beam scan strategies employed. The optimum parameters for charge neutralisation for a particular metal powder may be influenced by factors such as the density of the material, the size and packing density of the powder particles, the capacitance of the metal oxide layer on the powder particles, the resistance to ground and whether the powder is static or mobile during irradiation with the electron beam 170. If the powder particles are static, the coefficient of static friction between the layer of powder and the material beneath (i.e. a supporting metal plate, previously melted layers of powder, sintered powder, or loose un-sintered powder) will play a role. If the powder is mobile, for example due to excess charging, the coefficient of dynamic friction will play a role in determining how readily the powder can be further moved by the incident electron beam 170.

The combination of build parameters and charge mitigation parameters used during a build will affect the nature of the manufactured part 30. For example, the material properties of the finished part 30 is dependent on the interaction between the layer of build material and the electron beam 170 scanning over the layer (i.e. the formation of melt pools, the movement of particles and large thermal gradients).

Additive Manufacturing Method

Figure 4:
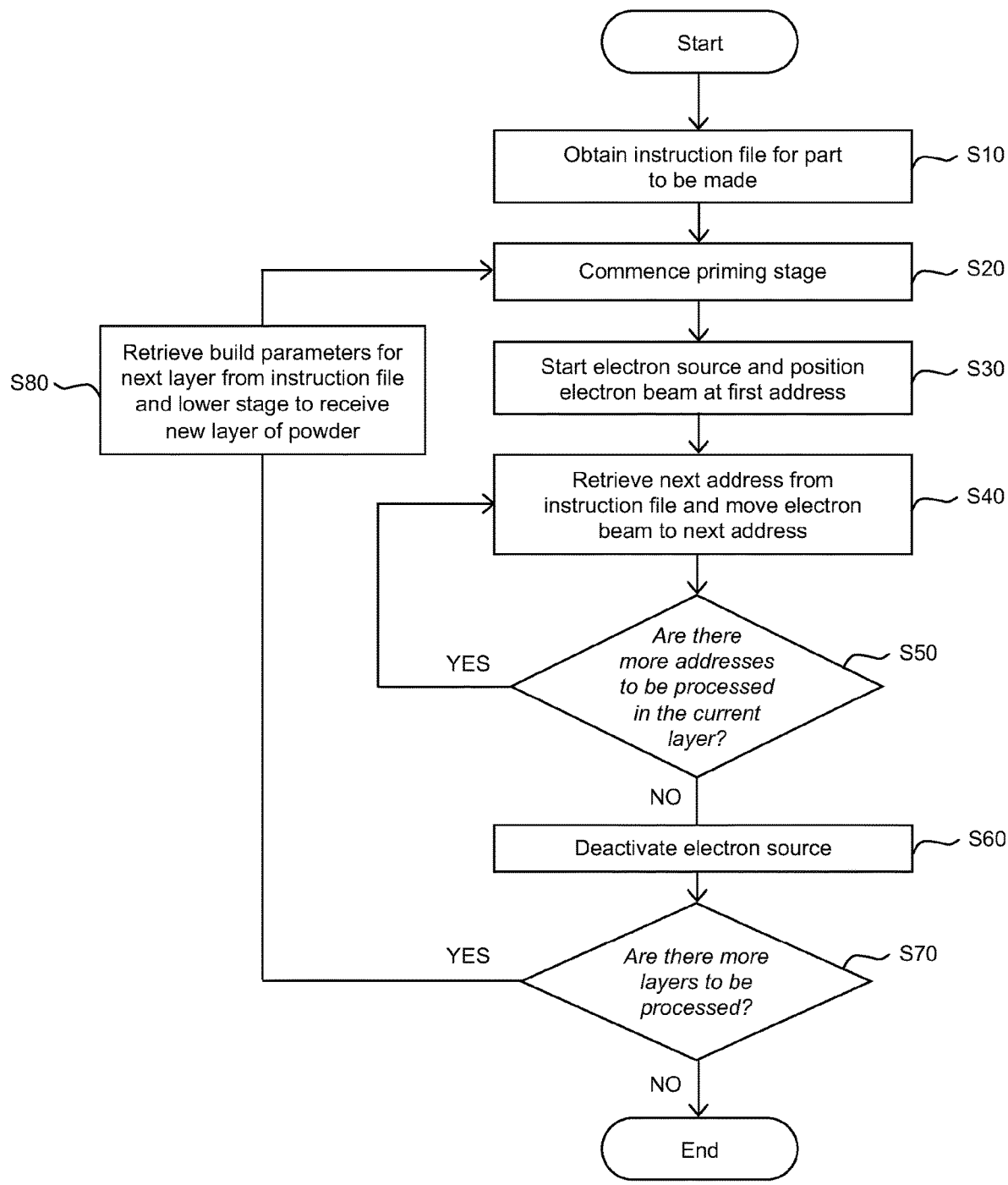
FIG. 4 shows a method of operating an additive manufacture apparatus according to embodiments of the present invention.

A method of additive manufacture using a powder bed fusion apparatus 10, according to embodiments of the present invention, is also provided, as illustrated with reference to FIG. 4, and described in conjunction with the powder fusion apparatus 10 described with reference to FIG. 3.

The build controller obtains an instruction file for a part 30 to be made at step Sm. The instruction file contains the computer-executable instructions to be followed by the controller to form the part 30, for example electron beam build parameters (e.g. beam energy, current, scan speed, spot-size) and a sequence of addresses on the powder bed 20 to position the electron beam 170 to form each layer of the part 30.

At step S20 a priming stage is performed. The build controller controls the ion source 110 in accordance with a received specification of charge mitigation parameters (e.g. a particular ion beam current and energy to optimise a particular build process). The powder bed 20 is irradiated with the ion beam 160 to charge the powder bed 20 to a low positive potential of the same magnitude as the energy of the ion beam 160 (for example, positive ions leaving the ion source 110 with a user-specified kinetic energy of 200 eV would induce a +200 V potential on the powder bed 20). As described above, priming the powder bed 20 prior to the start of a build process, and prior to the start of the build of each new layer, results in the accumulation of a cloud of free ions above the powder bed 20, which are then available for charge neutralisation throughout the build process.

The priming stage may involve positioning the ion beam 160 on the powder bed 20 at a position corresponding to the first address of the electron beam 170, such that the area of the powder bed 20 at which the build starts is primed in advance. In alternative embodiments, the ion focusing system 220 may be utilised to de-focus the ion beam 160 such that a larger area of the powder bed 20 is primed prior to the start of the build, or the ion deflection system 150 may be utilised to scan the ion beam 160 across as much as the whole area of the powder bed 20, depending on the requirements of the build.

At step S30, the build controller starts the electron source 70 in accordance with a specification of build parameters and positions the electron beam 170 at the first address retrieved from the instruction file. Embodiments of the present invention are compatible with any particular scan strategy. When the electron beam 170 is incident on the powder bed 20, it begins to melt the powder. Prior to melting the powder, step S30 may, in some embodiments, further include a pre-heating stage in which the area to be melted is heated prior to melting, so as to assist with the melting process. The positive charge that accumulated on the powder bed 20 during the priming stage is immediately removed by the negative charge accumulating on the powder bed 20 due to the electron beam 170. Positive ions from the cloud of free ions above the powder bed 20 are thus attracted to the accumulating negative potential on the powder bed 20 where they counteract the negative charge due to the electron beam 170, establishing an equilibrium potential on the area of the powder being melted.

At step S40, the build controller retrieves the next address from the instruction file and moves the electron beam 170 to the specified address on the powder bed 20. As the electron beam 170 moves over the powder bed 20, the electron beam 170 melts the powder to form a desired additive manufactured part 30. The weakly focused ion beam 160 loosely follows the position of electron beam 170 such that the electron beam 170 and the ion beam 160 are scanned pseudo-synchronously across the powder bed 20. In some embodiments, the ion beam 160 does not move continuously, and changes position only if the position of the electron beam 170 moves outside of the area of the powder bed 20 covered by the ion beam 160.

At step S50 a decision is made by the build controller as to whether there are more addresses in the instruction file at which the electron beam 170 is to be positioned within the layer of the pall 30 being produced. If there are more positions, the method returns (S50—Y) to step S40 and moves the electron beam 170 to the next position in the sequence of addresses in the instruction file. If there are no more positions within the layer (S50—N), the method proceeds to step S60.

In addition to the initial priming stage described above, continuous priming of the powder occurs throughout the build. As the ion beam 160 is weakly focused over a larger region of powder than the electron beam 170, and is scanned in pseudo-synchronisation with the electron beam 170, an area of powder surrounding the irradiation position of the electron beam 170 is primed before it is irradiated by the electron beam 170 as it moves through the sequence of addresses on the powder bed 20.

At step S60, the electron beam 170 is switched off. At step S70 the build controller determines whether there are more layers in the instruction file to be processed. If there are no more layers to process (S70—N), the method ends. However, if not all layers have been processed, the method returns (S70—Y) via step S80 to step S20. In step S80, build parameters for the next layer for the electron beam 170 are retrieved from the instruction file, and the stage 200 is dropped and new powder spread to form the powder bed 20 for the next layer of the part 30. On return to step S20, priming of the newly spread powder is performed.

In this way, the electron beam 170 may be scanned though all the addresses specified in the instruction file, and the ion beam 160 scanned in pseudo-synchronisation with the electron beam 170, for each layer of the part 30 such that the part 30 is formed by additive layer manufacture, and the ion beam 160 used to prime the powder bed 20 prior to each layer being processed.

In alternative embodiments in which the ion source is a plasma flood source 11 (i.e. the configuration shown in FIG. 1) the build process is substantially as described above, but comprises using an ion flux 16 to neutralise the powder bed 2, rather than pseudo-scanning a weakly focused ion beam 160 across the powder bed 20.

In the embodiments described above, the ion source is described as providing positive ions, of opposite charge to the electrons of the irradiating electron beam. However, in alternative embodiments, the ion source may provide electrons or negatively charged ions to mitigate charge from a positively charged high energy beam. The same principles of operation apply as those described above.

It will be appreciated that the powder bed fusion apparatus can be configured in a number of different ways, depending on the requirements of a user for a particular build process, and compatible features of different embodiments may be readily combined, such the nature of the neutralising particle source, the snubber system, and the focusing system for the neutralising particles. As described above, the independent control of ion energy and ion current is one such aspect which can be varied.

The invention claimed is:

1. A method of additive manufacture using a powder bed fusion apparatus, the method comprising forming a part as a series of layers, each layer formed by the steps of:
    (a) controlling a first source to irradiate a powder bed with first charged particles to form a region of first charged particles, wherein the region of first charged particles comprises first charged particles, on the powder bed and a cloud of first charged particles in proximity to the powder bed, wherein the first charged particles are positively charged ions and the powder bed is irradiated such that the powder bed becomes charged to a positive potential;
    (b) after the region of first charged particles is formed, controlling a second source to irradiate the powder bed using a beam of second charged particles of an opposite charge to the first charged particles, the method comprising scanning the beam of second charged particles over the powder bed to melt the powder according to a predetermined pattern, wherein the beam of second charged particles is a negatively charged electron beam; and (c) deactivating the beam of second charged particles and forming a new layer of powder of the powder bed;

wherein the first source of the first charged particles is active when the powder bed is irradiated using the beam of second charge particles, such that the cloud of first charged particles in proximity to the powder bed is sustained and acts to mitigate charging of the powder bed by the beam of second charged particles.

2. A method according to claim 1, comprising controlling the kinetic energy and current of the first charged particles such that an equilibrium potential below the threshold required to induce powder motion is maintained on the powder bed due to the interaction of the cloud of first charged particles in proximity to the powder bed and the beam of second charged particles as the beam of second particles is scanned over the powder bed.

3. A method according to claim 1, further comprising:
focusing the first charged particles on to the powder bed in the vicinity of an irradiation position of the beam of second charged particles, such that the cloud of first charged particles in proximity to the powder bed mitigates charging of the powder bed by the beam of second charged particles.

4. A powder bed fusion apparatus for use in additive manufacturing, the apparatus comprising:
a first source of first charged particles operable to provide first charged particles, wherein the first charged particles are positively charged ions;
a second source of second charged particles operable to provide a beam of second charged particles of an opposite charge to the first charged particles, wherein the beam of second charged particles is a negatively charged electron beam;
a powder bed for receiving the first charged particles and the beam of second charged particles; and
a controller configured to control operation of the first source and the second source to form a part as a series of layers, each layer formed by the steps of:
(a) irradiating the powder bed with the first charged particles to form a region of first charged particles, wherein the region of first charged particles comprises first charged particles on the powder bed and a cloud of first charged particles in proximity to the powder bed, wherein the powder bed is irradiated such that the powder bed becomes charged to a positive potential;
(b) after the region of first charged particles is formed, irradiating the powder bed using the beam of second charged particles of an opposite charge to the first charged particles, wherein the beam of second charged particles is scanned over the powder bed to melt the powder according to a predetermined pattern; and
(c) deactivating the beam of second charged particles and forming a new layer of powder of the powder bed;
wherein the first source of first charged particles is configured to be active when the powder bed is irradiated using the beam of second charged particles, such that the cloud of first charged particles in proximity to the powder bed is sustained and acts to mitigate charging the powder bed by the beam of second charged particles.

5. A powder bed fusion apparatus according to claim 4, wherein the first source of first charged particles is an ion source configured to generate positive ions of a noble gas.

6. A powder bed fusion apparatus according to claim 5, comprising a plasma source as the first source of first charged particles to generate the positive ions.

7. A powder bed fusion apparatus according to claim 6, wherein the plasma source is a thermionic emission plasma flood source, a radio frequency plasma source, a hollow cathode plasma source or a duoplasmatron.

8. A powder bed fusion apparatus according to claim 6, wherein the plasma source is a hollow cathode plasma source or a duoplasmatron, the apparatus further comprising a neutralising particle focusing system arranged to focus a beam of the first charged particles on to the powder bed in the vicinity of an irradiation position of the beam of second charged particles on the powder, such that the first charged particles mitigate charging of the powder bed by the beam of second charged particles.

9. A powder bed fusion apparatus according to claim 8, further comprising a negative extractor electrode or a grid extractor positioned at an output of the plasma source to extract positively charged ions from the plasma to form the beam of first charged particles, wherein the current of the beam of first charged particles is unaffected by a bias potential applied to the plasma source.

10. A powder bed fusion apparatus according to claim 9, wherein the neutralising particle focusing system comprises a series of electrostatic cylindrical or aperture lens elements aligned along the beam of the first charged particles between the plasma source and the powder bed, and spaced apart so as to support an electric field therebetween, in which each lens element is referenced to a different respective electric potential.

11. A powder bed fusion apparatus according to claim 10, wherein an electrostatic lens element nearest the powder bed is configured to be at substantially ground potential such that the energy of the first charged particles is substantially defined by the bias potential applied to the plasma source.

12. A powder bed fusion apparatus according to claim 8, wherein the neutralising particle focusing system comprises a series of electromagnetic lens elements aligned along the beam of the first charged particles between the plasma source and the powder bed, in which each lens element conducts a different respective electric current.

13. A powder bed fusion apparatus according to claim 12, further comprising one or more ferrites surrounding one or more of the electromagnetic lens elements, such that there is substantially no magnetic field outside of the neutralising particle focusing system.

14. A powder bed fusion apparatus according to claim 8, further comprising a scanning system arranged to control the beam of first charged particles such that the beam of first charged particles is scanned over the powder bed in pseudo-synchronisation with the beam of second charged particles, wherein the scanning system comprises electrostatic or electromagnetic deflectors positioned within a final lens element of the neutralising particle focusing system.

15. A powder bed fusion apparatus according to claim 14 in which the scanning system comprises electrostatic deflectors, further comprising a wire mesh configured to be at ground potential and positioned at the output of the electrostatic lens element nearest the powder bed, such that there is substantially no electric field penetration from the neutralising particle focusing system or electrostatic deflectors onto the powder bed.

16. A powder bed fusion apparatus according to claim 8, wherein the focusing system employs a bend, such that there is no direct line of sight between the plasma source and the powder bed through the focusing system.

17. A powder bed fusion apparatus according to claim 8, further comprising heat shields positioned around the powder bed, wherein the heat shields are configured to be at ground potential such that there is substantially no electric field between the heat shields and a portion of the focusing system nearest the powder bed.

18. A powder bed fusion apparatus according to claim 6, further comprising a snubber circuit configured for use in series with a bias potential applied to the neutralising particle source.

19. A powder bed fusion apparatus according to claim 4, wherein the first source of first charged particles is contained in an auxiliary chamber coupled to a main build chamber of the powder bed fusion apparatus.

* * * * *